US007106746B1

(12) United States Patent
Dorbolo

(10) Patent No.: US 7,106,746 B1
(45) Date of Patent: Sep. 12, 2006

(54) METHOD AND SYSTEM FOR DATA STREAM SWITCHING

(75) Inventor: Riccardo G. Dorbolo, Petaluma, CA (US)

(73) Assignee: Cisco Technology, Inc., San Jose, CA (US)

( * ) Notice: Subject to any disclaimer, the term of this patent is extended or adjusted under 35 U.S.C. 154(b) by 911 days.

(21) Appl. No.: 09/918,154

(22) Filed: Jul. 30, 2001

(51) Int. Cl.
*H04L 12/56* (2006.01)
*H04J 14/00* (2006.01)

(52) U.S. Cl. ............... 370/395.51; 370/474; 370/907; 398/45

(58) Field of Classification Search ............... 370/389, 370/392, 395.1, 395.4, 395.51, 395.32, 395.53, 370/442, 458, 478, 498, 535, 537, 907, 910, 370/466, 474, 395.3, 395.5; 398/43, 45, 398/52, 58, 98, 99
See application file for complete search history.

(56) References Cited

U.S. PATENT DOCUMENTS

| | | | | |
|---|---|---|---|---|
| 6,014,708 A * | 1/2000 | Klish | ................... | 709/232 |
| 6,496,518 B1 * | 12/2002 | Taniguchi | ................... | 370/465 |
| 6,496,519 B1 * | 12/2002 | Russell et al. | ................... | 370/465 |
| 6,501,758 B1 * | 12/2002 | Chen et al. | ................... | 370/395.1 |
| 6,597,689 B1 * | 7/2003 | Chiu et al. | ................... | 370/354 |
| 6,631,130 B1 | 10/2003 | Roy et al. | ................... | 370/352 |
| 6,636,511 B1 | 10/2003 | Roy et al. | ................... | 370/390 |
| 6,636,515 B1 | 10/2003 | Roy et al. | ................... | 370/395.1 |
| 6,646,983 B1 | 11/2003 | Roy et al. | ................... | 370/218 |
| 6,870,877 B1 * | 3/2005 | Notani | ................... | 375/221 |
| 2003/0056017 A1 * | 3/2003 | Gonda | ................... | 709/251 |

OTHER PUBLICATIONS

Boulos, "SONET and TDM Harmony: Efficient Gateway Solutions for TDM Edge Delivery off SONET Cores," Telco Systems EdgeLinksSTS/T1 and EdgeLinkSTS/T3 White Paper, 5 pages, Jun. 2000.
Blesch, "Lucent Technologies introduces cross-connect chip for high-speed optical networking systems," Lucent Technologies, www.lucent.com/press/0900/000925.mec.html, 3 pages, Sep. 25, 2000.
TDCS6440G SONET/SDH 40 Gbits/s Cross Connect Product Brief, agere systems, 4 pages, Sep. 2000.

* cited by examiner

*Primary Examiner*—Chi Pham
*Assistant Examiner*—Tri H. Phan
(74) *Attorney, Agent, or Firm*—Baker Botts L.L.P.

(57) ABSTRACT

A method, system, and logic for switching data streams are disclosed. Synchronous transport signal streams are generated. A destination for each synchronous transport signal stream is recorded in the overhead of the synchronous transport signal stream. The synchronous transport signal streams are transmitted to a switch, which routes the synchronous transport signal stream according to the recorded destination.

39 Claims, 3 Drawing Sheets

| | | | |
|---|---|---|---|
| SECTION OVERHEAD | A1 (A1) | A2 (A2) | PORT0 (J0) |
| | B1 (B1) | TS0 (ORDERWIRE) | RESERVED (F1) |
| | RESERVED (D1) | RESERVED (D2) | RESERVED (D3) |
| TRANSPORT OVERHEAD | H1 (H1) | H2 (H2) | H3 (H3) |
| | CRC (B2) | UNUSED (K1) | UNUSED (K2) |
| | UNUSED (D4) | UNUSED (D5) | UNUSED (D6) |
| | UNUSED (D7) | UNUSED (D8) | UNUSED (D9) |
| | UNUSED (D10) | UNUSED (D11) | UNUSED (D12) |
| | SOURCEA (S1) | SOURCEB (M0) | UNUSED (E2) |

METHOD AND SYSTEM FOR DATA STREAM SWITCHING

TECHNICAL FIELD OF THE INVENTION

This invention relates in general to communications networks, and more particularly to a method and system for data stream switching.

BACKGROUND OF THE INVENTION

Communications networks such as synchronous optical networks require switches that route data streams to their appropriate destination. Some switches, however, are not able to respond to changes in network traffic and thus cannot efficiently route data streams. As a result, some switches are inadequate for many needs.

SUMMARY OF THE INVENTION

In accordance with the present invention, disadvantages and problems associated with data stream switching have been substantially reduced or eliminated.

According to one embodiment of the present invention, a method and logic for switching data streams are disclosed. Synchronous transport signal streams are generated at a transmitting interface. A destination associated with each synchronous transport signal stream is determined, and is recorded in an overhead of the associated synchronous transport signal stream. The synchronous transport signal streams are transmitted to a switch. Each synchronous transport signal stream is routed according to the associated destination.

According to one embodiment of the present invention, a system for switching data streams is disclosed. The system includes a transmitting interface and a switch. The transmitting interface generates synchronous transport signal streams, determines a destination associated with each synchronous transport signal stream, and records the destination in an overhead of the associated synchronous transport signal stream. The switch receives the synchronous transport signal streams from the transmitting interface, determines the destinations from the overheads, and routes each synchronous transport signal stream according to the associated destination.

According to one embodiment of the present invention, a switch for switching data streams is disclosed. The switch includes an input, a monitor, and a control module. The input receives synchronous transport signal streams. Each synchronous transport signal stream includes an overhead that records a destination. The monitor receives the synchronous transport signal streams from the input and determines the destinations recorded in the overheads. The monitor reconfigures the control module to route each synchronous transport signal stream to the destination recorded in the overhead of the synchronous transport signal stream.

Important technical advantages of certain embodiments of the present invention include providing an interface that determines the destination for a synchronous transport signal stream, records the destination in the overhead of the stream, and transmits the stream to a switch. The interface may negotiate with other interfaces to determine an efficient distribution of streams based on, for example, the data traffic at each interface. By providing an interface to perform such tasks, the switch is not required to have processing and storage capacity to perform these tasks.

Other important technical advantages of certain embodiments of the present invention include providing a switch that reads the destination recorded in the stream, and dynamically reconfigures itself to route the stream to the destination. Thus, the switch is able to respond to changes in stream routing in order to efficiently switch data streams.

BRIEF DESCRIPTION OF THE DRAWINGS

For a more complete understanding of the present invention and its advantages, reference is now made to the following description, taken in conjunction with the accompanying drawings, in which:

FIG. 2 illustrates an exemplary transport overhead of a data stream; and

DETAILED DESCRIPTION OF THE INVENTION

Figure 1:
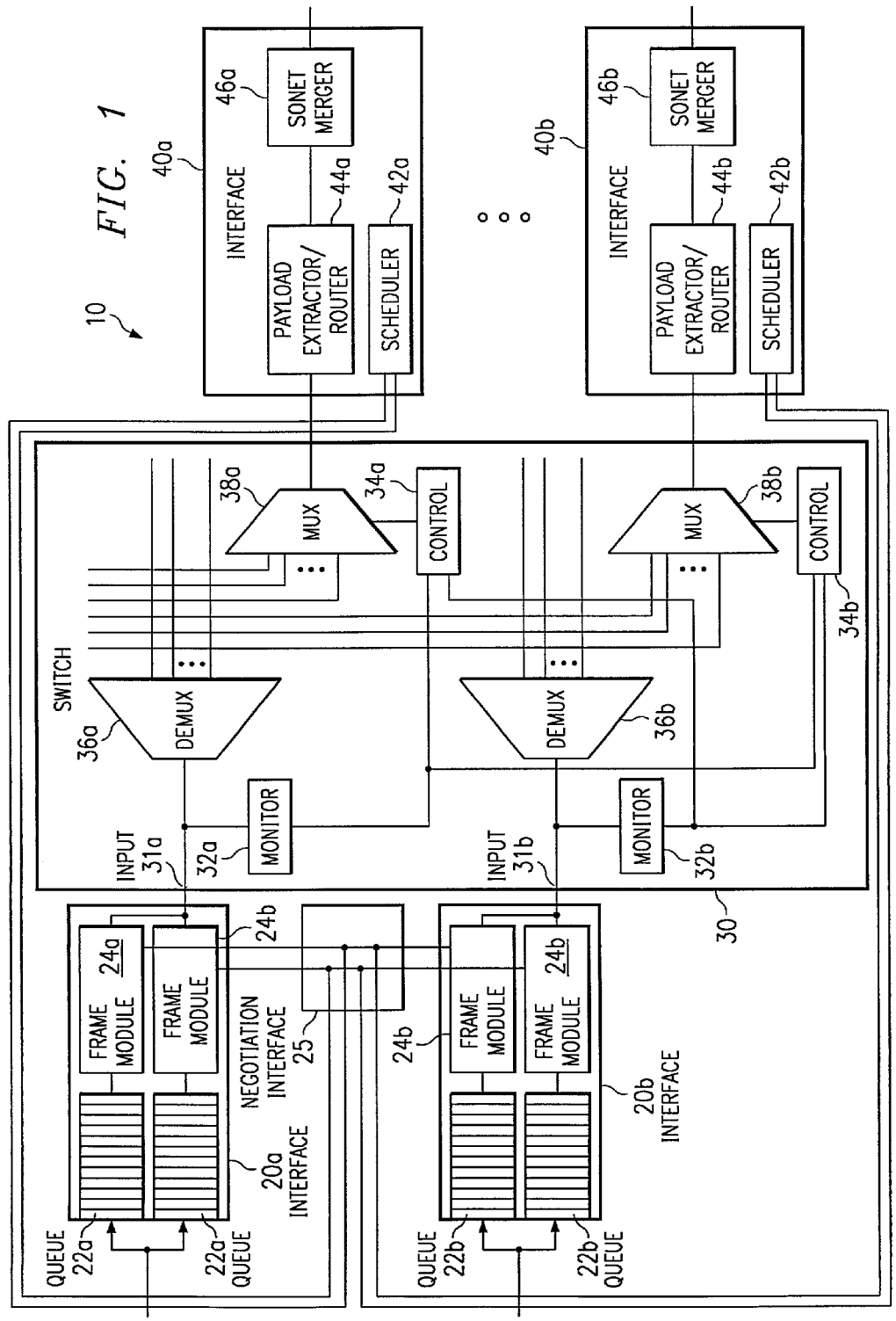
FIG. 1 illustrates an exemplary system for dynamically switching data streams.

FIG. 1 illustrates an exemplary system 10 for dynamically switching data streams. System 10 includes one or more transmitting interfaces 20 coupled to a switch 30, which in turn is coupled to one or more destination interfaces 40. In general, a transmitting interface 20 generates a number of data streams and determines a destination for each stream. Transmitting interface 20 records the destination in an overhead of each stream and transmits the streams to switch 30. Switch 30 reads the destination from the overhead of the streams and then routes the streams to the appropriate destination interface 40.

In one embodiment, a transmitting interface 20 may comprise, for example, an interface card for synchronous optical network (SONET) streams or an interface card for non-SONET data streams such as Ethernet, Internet Protocol (IP), or asynchronous transfer mode (ATM) data streams. Transmitting interfaces 20 receive data from a network. The network may include, for example, a telecommunications network, a public or private data network, a wired or wireless network, a metropolitan area network (MAN), a local area network (LAN), a SONET network or any other suitable communications network. The data may be based on any suitable communications standard, such as a synchronous digital hierarchy (SDH), pleisochronous digital hierarchy (PDH), SONET, Ethernet, IP, or ATM communications standard.

In one embodiment of transmitting interface 20, a queue 22 organizes and stores the data, and may organize the data according to a first in, first out (FIFO) basis. "Each" as used in this document means each member of a set or each member of a subset of a set. One queue 22 may be designated for each destination interface 40. Alternatively, one queue 22 may be designated for each quality of service or traffic category of a destination interface 40. Alternatively, queues 22 may be omitted, for example, if the received data is based on a SONET, PDH, or similar communications standard. A frame module 24 receives the data from a queue 22 and generates a number of data packets from the data.

A data packet may be transported by for example, one or more synchronous transport signal-level 1 (STS-1) streams. The number of STS-1 streams may be dynamically allocated to each SONET frame. An STS-1 stream includes a payload and a transport overhead. The payload includes information that is being transported by the STS-1 stream. The transport overhead supports operations, administration, maintenance and provisioning, and includes a data communication channel that provides an operations, administration, maintenance, and provisioning communication path between network elements. A transport overhead for an STS-1 stream is described in more detail in connection with FIG. 2. A number n of STS-1 streams may be multiplexed together to yield an STS-n stream, which may also include a payload and a transport overhead. Although STS-1 and STS-n streams are described, any suitable data streams may be used.

FIG. 2 is a diagram illustrating an exemplary transport overhead 50 of an STS-1 stream. Transport overhead 50 includes fields 52. Fields 52 may or may not be defined to include specific information. A field 52 such as a CRC (B2) field may be used to record a destination of an STS-1 stream.

Referring back to FIG. 1, frame module 24 determines a destination for each STS-1 stream. The destination may include, for example, an interface identifier that identifies a specific destination interface 40 and a specific time slot of an STS-n stream that is to be transmitted to the destination interface 40. In one embodiment, frame module 24 may negotiate through a negotiating interface 25 with other frame modules 24 to determine the destinations for the STS-1 streams. In another embodiment, frame module 24 may negotiate with a scheduler 42 of a destination interface 40 to determine the destinations.

The destinations may be based on, for example, a predetermined priority. Streams at one transmitting interface 20 may be given priority over streams at another transmitting interface 20. Destinations may also be determined by the amount of data at each transmitting interface 20. For example, frame module 24a may have priority over frame module 24b in the selection of the destinations if queue 22a has more data than queue 22b. Frame module 24 records the destination of a STS-1 stream in the transport overhead of the STS-1 stream. The destination may be recorded in, for example, a PORT0 and TS0 field 52.

Transmitting interfaces 20 may multiplex the STS-1 streams together to form an STS-n stream that is sent to switch 30. The STS-1 streams may be multiplexed by, for example, interleaving the STS-1 streams. The transport overhead of the STS-n stream includes the destination of each STS-1 stream.

Switch 30 receives the STS-n streams from transmitting interfaces 20 and routes the STS-1 streams to the appropriate destination interfaces 40. Inputs 31 receive the STS-n streams from transmitting interfaces 20. Monitors 32 read the destination of each STS-1 stream, which is included in the transport overhead of the STS-n stream. Monitors 32 reconfigure control modules 34 to send the STS-1 streams to the appropriate destinations. For example, monitor 34a may dynamically reconfigure control module 34a to select STS-1 streams that specify destination interface 40a as their destination, and to insert the STS-1 streams in the time slot specified as their destination. Alternatively, control modules 34 may be programmed to not accept dynamic reconfiguration from monitors 32 in order to maintain a predetermined static configuration. Monitors 32 and control modules 34 may be omitted for transmitting interfaces 20 that receive data based on a SONET, PDH, or similar communications standard.

A demultiplexer (DMUX) 36 demultiplexes a STS-n stream into multiple STS-1 streams that may be selected by multiplexers 38. Control module 34a instructs multiplexer 38a to select STS-1 streams that have destination interface 40a as a destination. Similarly, control module 34b instructs multiplexer 38b to select streams that have destination interface 40b as a destination. Control modules 34 also instruct multiplexers 38 to insert the selected streams into the timeslots designated as their destination. Each multiplexer 38 then multiplexes the STS-1 streams to yield an STS-n stream, which is transmitted to destination interfaces 40.

In one embodiment, destination interface 40 includes scheduler 42, a payload extractor/router 44, and a SONET merger 46. Scheduler 42 allocates timeslots to data streams. Payload extractor and router 44 extracts data from STS-n streams. SONET merger 46 merges SONET data streams with data streams based on other communications standards.

Figure 3:
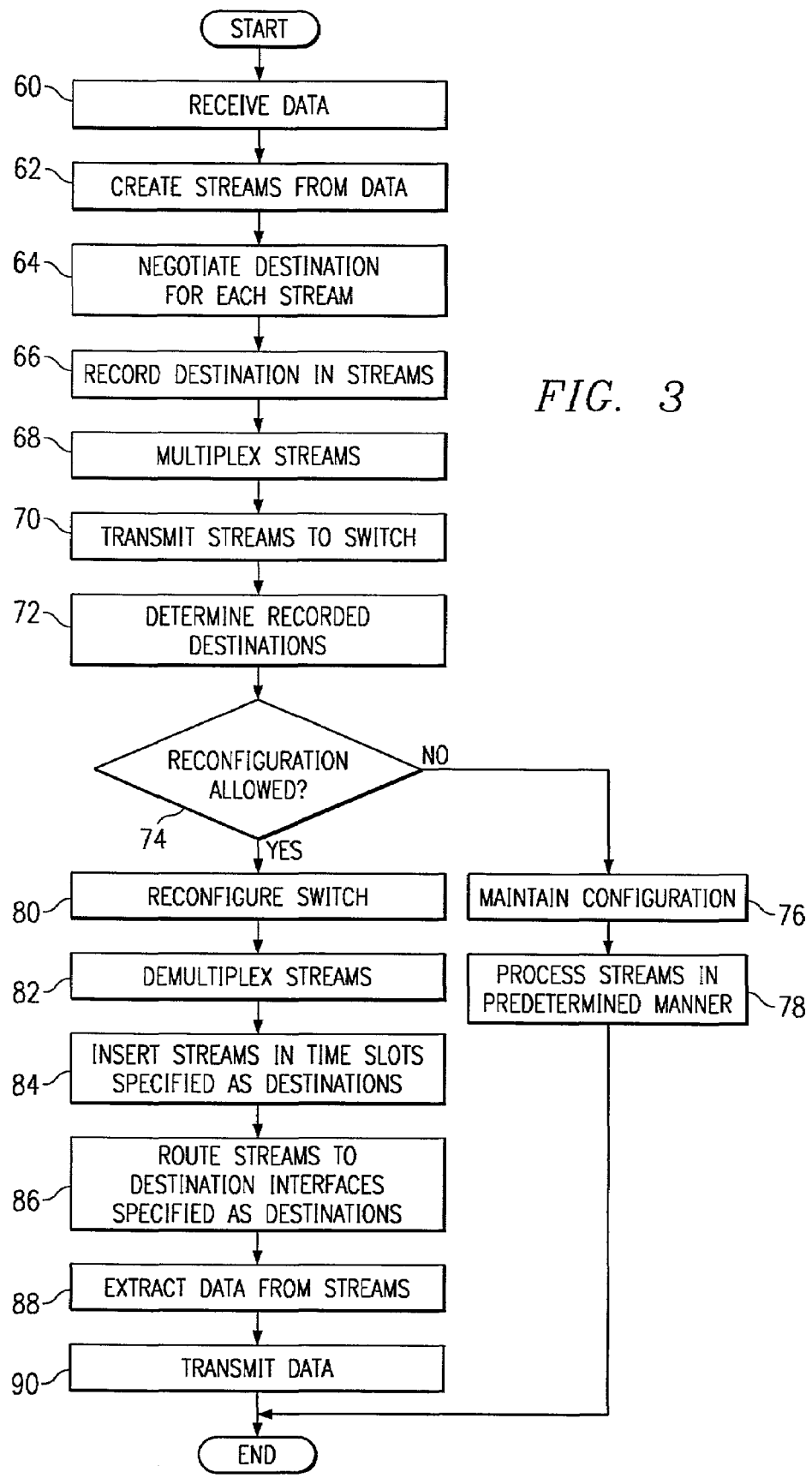
FIG. 3 illustrates an exemplary method for dynamically switching data streams.

FIG. 3 illustrates an exemplary method for dynamically switching data streams. Although STS-1 and STS-n streams are described in the illustrated example, any suitable data streams may be used. The method begins at step 60, where transmitting interfaces 20 receive data. Transmitting interfaces 20 generate STS-1 streams from the data at step 62.

At step 64, transmitting interfaces 20 negotiate a destination for each STS-1 stream. Transmitting interfaces 20 may negotiate with each other or with destination interfaces 40. The destinations may be based on an amount of data at each transmitting interface 20. For example, the transmitting interface 20 that has the most data may have priority in the selection of the destinations of the STS-1 streams. Transmitting interfaces 20 record the destination in the transport overhead of each STS-1 stream, at step 66. The destinations may include, for example, an interface identifier of a specific destination interface 40 and a time slot of an STS-n stream to be transmitted to the destination interface 40.

In one embodiment, each transmitting interface 20 multiplexes the STS-1 streams into an STS-n stream at step 68. The STS-n streams are transmitted to switch 30 at step 70. Monitors 32 of switch 30 determine the destination of each STS-1 stream at step 72. Monitors 32 may read the destinations from the transport overhead of the STS-1 streams.

At step 74, control modules 34 may or may not be reconfigurable. Control modules 34 may be, for example, programmed to not accept dynamic reconfiguration. If control modules 34 are not reconfigurable, the method proceeds to step 76, where control modules 34 maintain their configuration. The STS-1 streams are then processed in a static, predetermined manner at step 78, and the method is terminated. If at step 74 control modules 34 are reconfigurable, the method proceeds to step 80, where monitors 32 reconfigure control modules 34 to route the streams to the appropriate destination.

In one embodiment, the STS-n streams are demultiplexed at step 82 to yield STS-1 streams. At step 84, each multiplexer 38 selects streams designated for an associated destination interface 40 in response to instructions from a control module 34. The multiplexer 38 inserts the STS-1 stream into the designated time slots of an STS-n stream. At step 86, multiplexers 38 transmit the STS-n streams to destination interfaces 40. Data is extracted from the STS-n streams at step 88. At step 90, destination interfaces 40 transmit the data to the appropriate destinations. After transmitting the data, the method is terminated.

Important technical advantages of certain embodiments of the present invention include providing interface 20 that determines the destination for a synchronous transport signal stream, records the destination in the overhead of the stream, and transmits the stream to switch 30. Interface 20 may negotiate with other interfaces 20 to determine an efficient distribution of streams based on, for example, the data traffic at each interface 20. By providing interface 20 to perform such tasks, switch 30 may not be required to have processing and storage capacity to perform these tasks.

Other important technical advantages of certain embodiments of the present invention include providing switch 30 that reads the destination recorded in the stream, and dynamically reconfigures itself to route the stream to the destination. Thus, switch 30 is able to respond to changes in stream routing in order to efficiently switch streams.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for switching data streams, comprising:
   generating a plurality of synchronous transport signal streams;
   determining a destination associated with each of the plurality of synchronous transport signal streams, wherein the destination associated with each of the plurality of synchronous transport signal streams is determined by conducting a negotiation for the destination between a first transmitting interface and a second transmitting interface, the destination indicating a destination interface of a plurality of destination interfaces each destination interface of the plurality of destination interfaces operable to transmit a synchronous transport signal stream of the plurality of synchronous transport signal streams;
   recording the destination in an overhead of an associated one of the plurality of synchronous transport signal streams; and
   routing each one of the plurality of synchronous transport signal streams according to the associated destination.

2. The method of claim 1, wherein:
   generating the plurality of synchronous transport signal streams comprises generating the plurality of synchronous transport signal streams at a transmitting interface; and
   further comprising transmitting the plurality of synchronous transport signal streams to a switch.

3. The method of claim 1, wherein recording the destination in the overhead of the associated one of the plurality of synchronous transport signal streams comprises recording the destination in a field of a transport overhead of the associated one of the plurality of synchronous transport signal streams.

4. The method of claim 1, wherein routing each of the plurality of synchronous transport signal streams comprises:
   determining the destination from the overhead of the associated one of the plurality of synchronous transport signal streams; and
   configuring a switch to route the associated one of the plurality of synchronous transport signal streams to the destination.

5. The method of claim 1, wherein routing each of the plurality of synchronous transport signal streams comprises:
   determining a time slot from the destination recorded in the overhead of the associated one of the plurality of synchronous transport signal streams; and
   inserting the associated one of the plurality of synchronous transport signal streams in the time slot of an outgoing synchronous transport signal stream.

6. The method of claim 1, wherein routing each of the plurality of synchronous transport signal streams comprises:
   determining a destination interface from the destination recorded in the overhead of the associated one of the plurality of synchronous transport signal streams; and
   transmitting the associated one of the plurality of synchronous transport signal streams to the destination interface.

7. The method of claim 1, wherein:
   each of the plurality of synchronous transport signal streams transports data based on a communications standard; and
   generating each of the plurality of the synchronous transport signal streams comprises generating each of the plurality of the synchronous transport signal streams at an interface based on the communications standard.

8. The method of claim 1, wherein:
   each of the plurality of synchronous transport signal streams comprises an associated synchronous transport signal-level 1 stream; and
   further comprising multiplexing the synchronous transport signal-level 1 streams to generate a synchronous transport signal-level n stream.

9. A system for switching data streams, comprising:
   a transmitting interface operable to:
      generate a plurality of synchronous transport signal streams;
      determine a destination associated with each one of the plurality of synchronous transport signal streams, wherein the destination of each one of the plurality of synchronous transport signal streams is determined by conducting a negotiation for the destination with a second transmitting interface, the destination indicating a destination interface of a plurality of destination interfaces, each destination interface of the plurality of destination interfaces operable to transmit a synchronous transport signal stream of the plurality of synchronous transport signal streams; and
      record the destination in an overhead of the associated one of the plurality of synchronous transport signal streams; and
   a switch coupled to the transmitting interface and operable to:
      receive the plurality of synchronous transport signal streams from the transmitting interface;
      determine the destinations from the overheads; and
      route each one of the plurality of synchronous transport signal streams according to the associated destination.

10. The system of claim 9, wherein the transmitting interface is operable to record the destination in the overhead of the associated one of the plurality of synchronous transport signal streams by recording the destination in a field of a transport overhead of the associated one of the plurality of synchronous transport signal streams.

11. The system of claim 9, wherein the switch is operable to route each of the plurality of synchronous transport signal streams by:
   determining the destination from the overhead of the associated one of the plurality of synchronous transport signal streams; and
   configuring the switch to route the associated one of the plurality of synchronous transport signal streams to the destination.

12. The system of claim 9, wherein the switch is operable to route each of the plurality of synchronous transport signal streams by:
  determining a time slot from the destination recorded in the overhead of the associated one of the plurality of synchronous transport signal streams; and
  inserting the associated one of the plurality of synchronous transport signal streams in the time slot of an outgoing synchronous transport signal stream.

13. The system of claim 9, wherein the switch is operable to route each of the plurality of synchronous transport signal streams by:
  determining a destination interface from the destination recorded in the overhead of the associated one of the plurality of synchronous transport signal streams; and
  transmitting the associated one of the plurality of synchronous transport signal streams to the destination interface.

14. The system of claim 9, wherein:
  each of the plurality of synchronous transport signal streams comprises data based on a communications standard; and
  the transmitting interface comprises an interface based on the communications standard.

15. The system of claim 9, further comprising a second the second transmitting interface coupled to the switch and operable to:
  generate the plurality of synchronous transport signal streams;
  determine a destination associated with each of the plurality of synchronous transport signal streams; and
  record the destination in an overhead of the associated one of the plurality of synchronous transport signal streams.

16. The system of claim 9, wherein
  each of the plurality of synchronous transport signal streams comprises a synchronous transport signal-level 1 stream; and
  the transmitting interface is operable to multiplex the synchronous transport signal-level 1 streams to yield a synchronous transport signal-level n stream.

17. A switch for switching data streams, comprising:
  an input operable to receive a plurality of synchronous transport signal streams, each of the plurality of synchronous transport signal streams comprising an overhead recording a destination;
  a monitor coupled to the input and operable to receive the plurality of synchronous transport signal streams from the input and to determine the destinations recorded in the overheads, wherein the destinations are determined by conducting a negotiation for the destination between a first transmitting interface and a second transmitting interface, the destination indicating a destination interface of a plurality of destination interfaces, each destination interface of the plurality of destination interfaces operable to transmit a synchronous transport signal stream of the plurality of synchronous transport signal streams; and
  a control module coupled to the monitor, the monitor operable to reconfigure the control module to route each of the plurality of synchronous transport signal streams to the destination recorded in the associated overhead.

18. The switch of claim 17, further comprising a multiplexer coupled to the control module and operable to multiplex at least two of the plurality of synchronous transport signal streams.

19. The switch of claim 18, wherein:
  the monitor is operable to determine a time slot from the destination recorded in the overhead of an associated one of the plurality of synchronous transport signal streams; and
  the multiplexer is operable to insert the associated one of the plurality of synchronous transport signal streams in the time slot of an outgoing synchronous transport signal stream.

20. The switch of claim 18, wherein:
  the monitor is operable to determine a destination interface from the destination recorded in the overhead of an associated one of the plurality of synchronous transport signal streams; and
  the multiplexer is operable to transmit the associated one of the plurality of synchronous transport signal streams to the destination interface.

21. The switch of claim 17, wherein:
  each of the plurality of synchronous transport signal streams comprises data based on a communications standard; and
  the input is operable to receive each of the plurality of synchronous transport signal streams from an interface based on the communications standard.

22. The switch of claim 17, wherein:
  each of the plurality of synchronous transport signal streams comprises a synchronous transport signal-level 1 stream; and
  the input is operable to receive a synchronous transport signal-level n stream that comprises each of the synchronous transport signal-level 1 streams.

23. A system for switching data streams, comprising:
  means for generating a plurality of synchronous transport signal streams;
  means for determining a destination associated with each one of the plurality of synchronous transport signal streams, wherein the destination of each one of the plurality of synchronous transport signal streams is determined by conducting a negotiation for the destination between a first transmitting interface and a second transmitting interface, the destination indicating a destination interface of a plurality of destination interfaces, each destination interface of the plurality of destination interfaces operable to transmit a synchronous transport signal stream of the plurality of synchronous transport signal streams;
  means for recording the destination in an overhead of the associated one of the plurality of synchronous transport signal streams; and
  means for routing each one of the plurality of synchronous transport signal streams according to the associated destination.

24. The system of claim 23, wherein:
  the means for generating the plurality of synchronous transport signal streams is operable to generate the plurality of synchronous transport signal streams at a transmitting interface; and
  further comprising means for transmitting the synchronous transport signal streams to a switch.

25. The system of claim 23, wherein the means for recording the destination in the overhead of the associated one of the plurality of synchronous transport signal streams is operable to record the destination in a field of a transport overhead of the associated one of the plurality of synchronous transport signal streams.

26. The system of claim 23, wherein the means for routing each of the plurality of synchronous transport signal streams is operable to route each one of the plurality of synchronous transport signal streams by:
  determining the destination from the overhead of the associated one of the plurality of synchronous transport signal streams; and
  configuring a switch to route the associated one of the plurality of synchronous transport signal streams to the destination.

27. The system of claim 23, wherein the means for routing each of the plurality of synchronous transport signal streams is operable to route each of the plurality of synchronous transport signal streams by:
  determining a time slot from the destination recorded in the overhead of the associated one of the plurality of synchronous transport signal streams; and
  inserting the associated one of the plurality of synchronous transport signal streams in the time slot of an outgoing synchronous transport signal stream.

28. The system of claim 23, wherein the means for routing each of the plurality of synchronous transport signal streams is operable to route each one of the plurality of synchronous transport signal streams by:
  determining a destination interface from the destination recorded in the overhead of each one of the plurality of synchronous transport signal streams; and
  transmitting each one of the plurality of synchronous transport signal streams to the destination interface.

29. The system of claim 23, wherein:
  each of the plurality of synchronous transport signal streams comprises data based on a communications standard; and
  the means for generating each one of the plurality of synchronous transport signal streams is operable to generate each one of the plurality of synchronous transport signal streams at an interface based on the communications standard.

30. The system of claim 23, wherein:
  each of the plurality of synchronous transport signal streams comprises a synchronous transport signal-level 1 stream; and
  further comprising means for multiplexing the synchronous transport signal-level 1 streams to yield a synchronous transport signal-level n stream.

31. Logic for switching data streams, the logic encoded in media and operable to:
  generate a plurality of synchronous transport signal streams;
  determine a destination associated with each of the plurality of synchronous transport signal streams, wherein the logic is operable to determine the destination of a synchronous transport signal stream by conducting a negotiation for the destination between a first transmitting interface and a second transmitting interface, the destination indicating a destination interface of a plurality of destination interfaces, each destination interface of the plurality of destination interfaces operable to transmit a synchronous transport signal stream of the plurality of synchronous transport signal streams;
  record the destination in an overhead of the associated one of the plurality of synchronous transport signal streams; and
  route each one of the plurality of synchronous transport signal streams according to the associated destination.

32. The logic of claim 31, wherein the logic is operable to:
  generate the plurality of synchronous transport signal streams at a transmitting interface; and
  transmit the plurality of synchronous transport signal streams to a switch.

33. The logic of claim 31, wherein the logic is operable to record the destination in the overhead of the associated one of the plurality of synchronous transport signal streams by recording the destination in a field of a transport overhead of the associated one of the plurality of synchronous transport signal streams.

34. The logic of claim 31, wherein the logic is operable to route each of the plurality of synchronous transport signal streams by:
  determining the destination from the overhead of each of the plurality of synchronous transport signal streams; and
  configuring a switch to route each of the plurality of synchronous transport signal streams to the destination.

35. The logic of claim 31, wherein the logic is operable to route each of the plurality of synchronous transport signal streams by:
  determining a time slot from the destination recorded in the overhead of the associated one of the plurality of synchronous transport signal streams; and
  inserting the associated one of the plurality of synchronous transport signal streams in the time slot of an outgoing synchronous transport signal stream.

36. The logic of claim 31, wherein the logic is operable to route each of the plurality of synchronous transport signal streams by:
  determining a destination interface from the destination recorded in the overhead of each one of the plurality of synchronous transport signal streams; and
  transmitting each one of the plurality of synchronous transport signal streams to the destination interface.

37. The logic of claim 31, wherein:
  each of the plurality of synchronous transport signal streams comprises data based on a communications standard; and
  the logic is operable to generate each one of the plurality of synchronous transport signal streams at an interface based on the communications standard.

38. The logic of claim 31, wherein:
  each of the plurality of synchronous transport signal streams comprises a synchronous transport signal-level 1 stream; and
  the logic is operable to multiplex the synchronous transport signal-level 1 streams to yield a synchronous transport signal-level n stream.

39. A system for switching data streams, comprising:
  a plurality of transmitting interfaces, at least one transmitting interface comprising an Ethernet interface, at least one transmitting interface comprising a SONET interface, each transmitting interface operable to:
    generate a plurality of synchronous transport signal streams, at least one synchronous transport signal stream comprising Ethernet data, at least one synchronous transport signal stream comprising SONET data;
    negotiate with a destination interface of a plurality of destination interfaces to determine a destination associated with each synchronous transport signal stream, the destination indicating a destination interface of a plurality of destination interfaces, each destination interface of the plurality of destination interfaces operable to transmit a synchronous transport signal stream of the plurality of synchronous transport signal streams; and record the destination in a transport overhead of the associated synchronous transport signal stream; and a switch coupled to the transmitting interfaces and comprising:

an input operable to receive the synchronous transport signal streams;

a monitor coupled to the input and operable to receive the synchronous transport signal streams from the input, and to determine a time slot and a destination interface from the destination recorded in the transport overhead of a synchronous transport signal stream;

a control module coupled to the monitor, the monitor operable to reconfigure the control module; and a multiplexer coupled to the control module and operable to receive a routing instruction from the control module, to insert a synchronous transport signal stream in the determined time slot of an outgoing synchronous transport signal stream, and to transmit the synchronous transport signal stream to the destination interface.

* * * * *